United States Patent
Wood

(10) Patent No.: US 6,921,447 B2
(45) Date of Patent: Jul. 26, 2005

(54) DYNAMIC PITCH CORRECTION IN PRESS CURED POWER TRANSMISSION BELTS

(75) Inventor: Douglas Bruce Wood, Lincoln, NE (US)

(73) Assignee: The Goodyear Tire & Rubber Company, Akron, OH (US)

(*) Notice: Subject to any disclaimer, the term of this patent is extended or adjusted under 35 U.S.C. 154(b) by 395 days.

(21) Appl. No.: 10/334,612

(22) Filed: Dec. 31, 2002

(65) Prior Publication Data

US 2004/0124552 A1 Jul. 1, 2004

(51) Int. Cl.[7] .......................... B29C 35/02; B29D 29/08
(52) U.S. Cl. ...................... 156/138; 156/139; 156/140; 156/141; 264/40.1; 264/326
(58) Field of Search ............................... 156/137–141; 264/40.1, 326

(56) References Cited

U.S. PATENT DOCUMENTS 4,575,445 A * 3/1986 Fujita et al. ................. 264/291
6,284,180 B1 * 9/2001 Feldmann ................... 264/254

* cited by examiner

Primary Examiner—Sam Chuan Yao
(74) Attorney, Agent, or Firm—Brouse McDowell; Roger D. Emerson; Heather M. Barnes

(57) ABSTRACT

A method for manufacturing a cured, toothed belt is carried out upon a on a belt-making machine. The method includes incrementally molding sections of the belt with tooth spacing based on an estimated pitch circumference derived from a measured inside circumference, defining and measuring a length of a remaining uncured portion of the belt, the length of the remaining uncured portion of the belt being compared to a design length, a difference between the length of the remaining uncured portion of the belt and the design length being an error; and, adjusting a distance between a centerline of the first drum and the second drum, so that a compensating error is evenly distributed over the remaining uncured portion of the belt. One advantage of this invention is that the cumulative error generated by measuring and curing each section of the belt in an "end to end" manner can be compensated by small adjustments made over a large section of the belt, preventing a large error in the last section of the belt.

10 Claims, 4 Drawing Sheets

DYNAMIC PITCH CORRECTION IN PRESS CURED POWER TRANSMISSION BELTS

1. BACKGROUND OF THE INVENTION

A. Field of Invention

This invention pertains to a method and apparatus for the manufacture of a toothed power transmission belt, and more particularly to a means of correcting the pitch of the belt dynamically, while the belt is being cured.

B. Description of the Related Art

Synchronous power transmission belts transmit motion and power by the engagement of teeth on the belt to teeth on driving and driven sprockets. Commercial tolerances for some of these belts are given in RMA Engineering Standards IP-24 and IP-27. The tolerance on tooth pitch length on such belts ranges from 4444 ppm for miniature belts of 91.44 mm pitch length to 291.5 ppm for large belts of 6860 mm pitch length. IP-27 specifies a pitch length tolerance of +−1.12 mm for a 200 tooth, 14 mm pitch belt, so the average tooth pitch tolerance is ±0.0056 mm. The pitch between adjacent teeth must be generally within ±0.0254 mm of the nominal pitch, and must be statistically distributed about the nominal value.

Statistical variation of material properties, thermal expansion, and dimensional variation of uncured belt components often result in cumulative error of pitch and tooth position when a synchronous power transmission belt is cured incrementally in a press. This cumulative error can result in excessive pitch error when a leading portion of the last section is cured to a trailing portion of the first section.

Press cured synchronous belts usually contain layers of fabric and elastomer that are formed into a flexible cylinder. A helical layer of one or more tensile members is also usually included. In a typical manufacturing process, the uncured and unmolded belts are supported on cylinders placed on either side of a planar mold. The cylinders maintain alignment of the belts to the mold during the sequential molding of belt sections, and also apply tension to the cords of the belt to prevent their displacement in the molding process.

The spacing of the teeth on the molded belt must be even all around the belt, even when the belt is shorter or longer than the nominal circumference. The exact circumference of the belt slab is difficult to measure accurately because the radius of the belt neutral plane on the cylinders is difficult to determine.

The present invention provides methods and apparatuses for avoiding large errors in tooth spacing independent of the actual circumference of the belt.

II. SUMMARY OF THE INVENTION

The present invention is directed to a new and improved method of controlling the pitch of adjacent teeth in a synchronous power transmission belt. The improved method is particularly useful for cylindrical belts that are sequentially cured in sections in a planar press.

According to one aspect of the invention, a method for manufacturing a cured, toothed belt is carried out upon a belt-making machine.

According to another aspect of the present invention a method for manufacturing a cured, toothed belt on a machine, the machine having a first cylinder, a second cylinder, first and second grippers, and a mold for forming teeth into an unmolded belt comprising an elastomer and reinforcing elements, the molding having a leading edge and a plurality of tooth cavities defined therein, the tooth cavities and mold length defining a tooth pitch, the method comprising the steps of:

positioning the unmolded belt on the machine;

molding a plurality of teeth into a first belt section, the belt section having a leading edge and a trailing edge;

advancing a portion of the first belt section out of the mold;

repeatedly molding belt sections until the leading edge of the first belt section travels around the first and second cylinders such that the leading edge lies in an axis parallel to the mold;

attaching the first gripper to a first location on the belt;

attaching the second gripper to a second location on the belt;

measuring the distance between the grippers;

determining the error in the remaining unmolded portion of the belt;

increasing or decreasing the center-to-center distance between the first and second cylinders; and, distributing the error about the remaining unmolded portion of the belt.

According to another aspect of the present invention, positioning the unmolded belt on the machine further comprises the steps of:

estimating a pitch length circumference; and, stretching the unmolded belt by moving the second cylinder so that the estimated pitch length circumference is an integer multiple of the mold tooth pitch.

According to another aspect of the present invention, after advancing the portion of the first belt section out of the mold, the method further comprises the steps of:

attaching the first gripper to belt teeth formed near the trailing edge teeth of the first belt section;

measuring the distance from the first gripper to a fixed point on the machine;

measuring the distance from the leading edge of the mold to the fixed point; and, determining if the belt is positioned within the mold such that a second molded belt section is properly positioned relative to the first molded belt section.

According to another aspect of the present invention, the method further comprises the step of rotating the cylinders forward or backward so that a partially vulcanized belt tooth may readily engage its respective tooth cavity.

According to another aspect of the present invention, the first cylinder is fixed.

According to another aspect of the present invention, the distance between the first and second grippers defines a length of a remaining unmolded portion of the belt.

According to another aspect of the present invention, determining the error in the remaining unmolded portion of the belt further comprises the step of:

comparing the length of the remaining unmolded portion of the belt to a design length.

According to another aspect of the present invention, distributing the error about the remaining unmolded portion of the belt further comprises the step of:

increasing or decreasing the center-to-center distance of the cylinders until the measured distance between the first and second grippers is an integer multiple of the tooth pitch of the mold.

According to another aspect of the present invention, the first location is where teeth are molded at a trailing edge of a most recently molded section of the belt.

According to another aspect of the present invention, the second location is where teeth are molded at the leading edge of the first molded belt section.

According to another aspect of the present invention, a method for manufacturing a cured, toothed belt on a belt-making machine, the belt-making machine having a first cylinder, a second cylinder, first and second grippers, and a mold for forming teeth into an unmolded belt comprising an elastomer and reinforcing elements, the first and second cylinders having a center-to-center distance, the belt having a belt pitch circumference, the tooth cavities and mold length defining a tooth pitch, the method comprising the steps of:

positioning the unmolded belt on the belt-making machine;

increasing or decreasing the center-to-center distance of the cylinders so that the belt pitch circumference is an integer multiple of the tooth pitch of the mold;

molding a plurality of teeth into a first belt section, the belt section having a leading edge and a trailing edge;

advancing a portion of the first belt section out of the mold;

attaching the first gripper to the teeth in the previously molded belt section;

measuring the distance between the first gripper and a fixed point on the belt-making machine;

measuring the distance between the fixed point and the leading edge of the mold;

determining whether the distance between the leading edge of the mold and the first gripper is an integer multiple of the tooth pitch of the mold; and, rotating first and second cylinders forward or backward to achieve proper pitch between the most recently molded belt section and the next molded belt section.

According to another aspect of the present invention, a method for manufacturing a cured, toothed belt on a belt-making machine, the belt-making machine having a first cylinder, a second cylinder, first and second grippers, and a mold for forming teeth into an unmolded belt comprising an elastomer and reinforcing elements, the first and second cylinders having a center-to-center distance, the belt having a belt pitch circumference the method comprising the steps of:

positioning the unmolded belt on the belt-making machine;

estimating the belt pitch circumference moving the second cylinder to stretch or contract the belt so that the belt pitch circumference is an integer multiple of the pitch of the mold; and, molding a plurality of teeth into a first belt section, the first molded belt section having a leading edge and a trailing edge.

According to another aspect of the present invention, the method further comprises the step of repeatedly estimating the belt pitch circumference, moving the second cylinder to stretch or contract the belt so that the belt pitch circumference is an integer multiple of the pitch of the mold, and molding the plurality of teeth into a belt section, until the leading edge of the first molded belt section lies in an axis parallel to the mold.

According to another aspect of the present invention, wherein the first gripper is attached to the trailing edge teeth of the most recently molded belt section.

According to another aspect of the present invention, the method further comprises the step of:

determining the integer multiple after every curing cycle.

According to another aspect of the present invention, a method for manufacturing a cured, toothed belt on a belt-making machine, the belt-making machine having a first cylinder, a second cylinder, first and second grippers, and a mold for forming teeth into an unmolded belt comprising an elastomer and reinforcing elements, the method comprising the steps of:

measuring the inside circumference of an unmolded belt which is loaded in tension by supporting cylinders and estimating the pitch length circumference from the inside circumference;

stretching the unmolded belt by moving the second cylinder so that the estimated pitch length circumference is a specified integer multiple of the tooth spacing of the mold;

molding and curing a first molded belt section of said belt in a first incremental molding step;

establishing a leading edge of the molded section of the belt;

opening the mold;

advancing the first molded belt section an integral number of teeth through the mold to an approximate position of a second incremental molding step;

measuring the position of the teeth of the first molded section;

moving the belt relative to the mold so that the most recently molded teeth are a specified integer multiple of the tooth spacing of the mold from the tooth cavities in the mold;

repeating incrementally, the steps of moving, measuring, and molding sections of the belt until the location of the teeth of the first section can be measured with respect to the mold and the trailing teeth of the most recently molded section;

measuring the position of the teeth of the first section relative to the trailing teeth of the most recently molded section;

stretching the partially molded belt by moving the cylinders so that the aforementioned distance between the first molded and most recently molded belt sections is a specified integer multiple of the tooth spacing of the mold;

repeating incrementally, the steps of moving, measuring, and molding sections of the belt until all sections of the belt have been molded.

One advantage of this invention is that the cumulative error generated by measuring and curing each section of the belt in an "end to end" manner can be detected before the last section is molded, and a small compensating error can be spread evenly over several molded sections of the belt. By introducing small, acceptable errors to several molded sections, a large unacceptable tooth pitch error is avoided in the last molded section.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Figure 1:
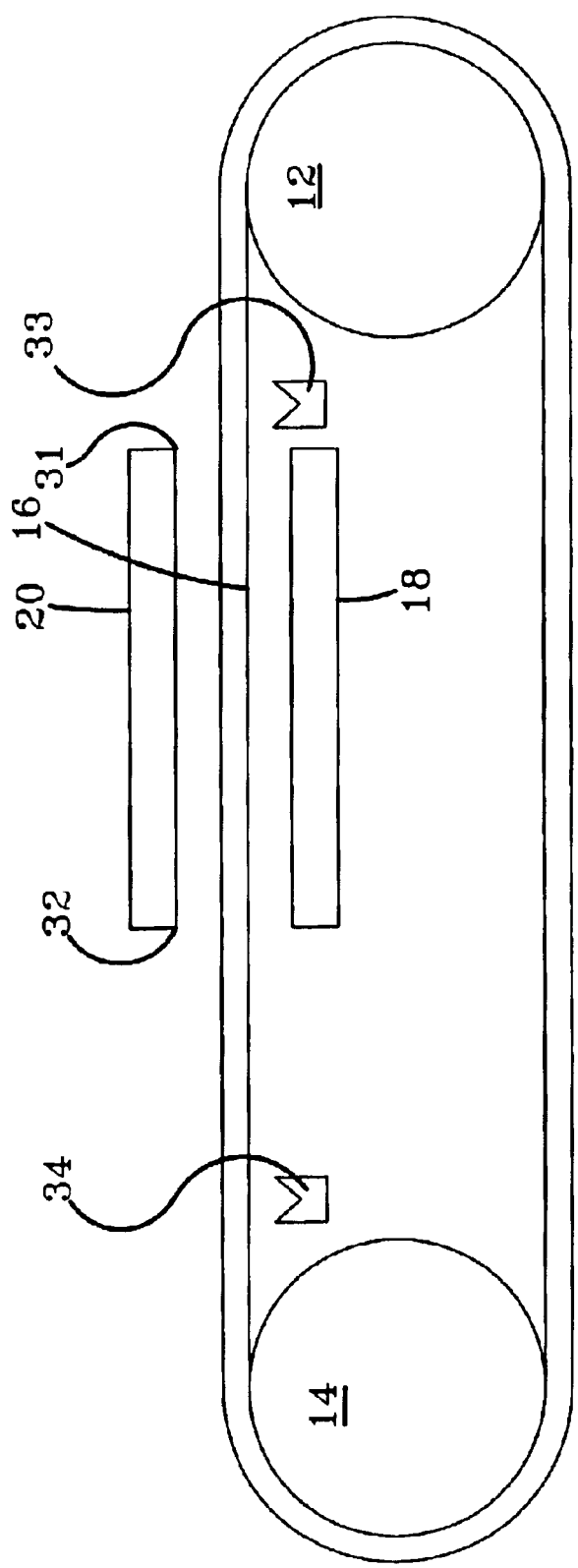
FIG. 1 is a schematic side view of a press cure manufacturing machine according to the present invention.

Referring now to the drawings wherein the showings are for purposes of illustrating a preferred embodiment of the invention only and not for purposes of limiting the same, FIG. 1 shows a schematic view of the innovative method and manufacturing machine according to the invention.

With continuing reference to FIG. 1, the manufacturing machine 10 includes a first cylinder 12 and a second cylinder 14. In the preferred embodiment, the first cylinder 12 is fixed and the second cylinder 14 is movable, so that the distance between the centers of the two cylinders can vary, thus, increasing or decreasing the tension on the belt 16 which is wrapped around the cylinders 12, 14. However, in other, currently unpreferred embodiments, the centers of each of the cylinders 12, 14 can move.

Figure 2:
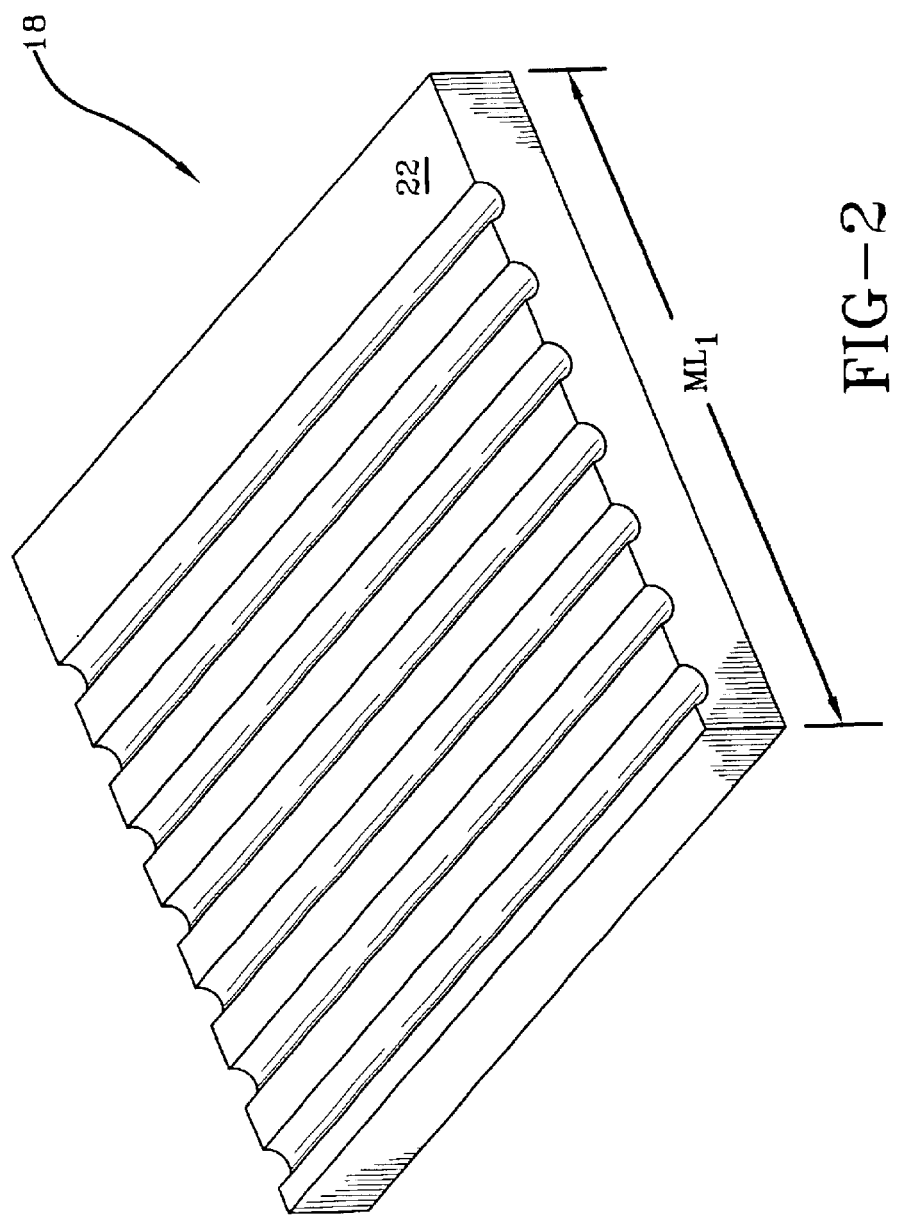
FIG. 2 is a view of the first mold half with straight tooth cavities.
Figure 3:
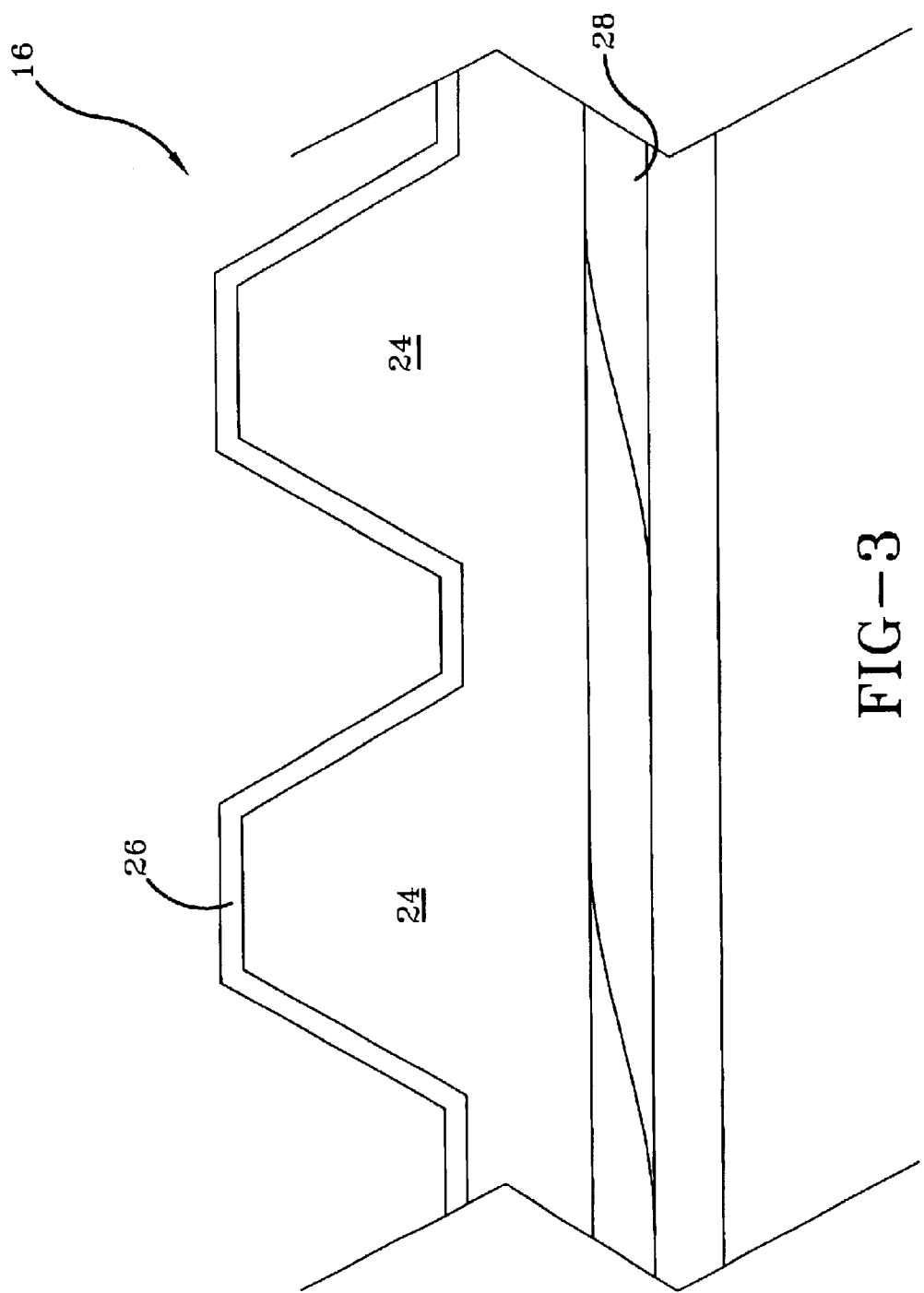
FIG. 3 is a cross-sectional representation of the teeth and the belt.
Figure 4:
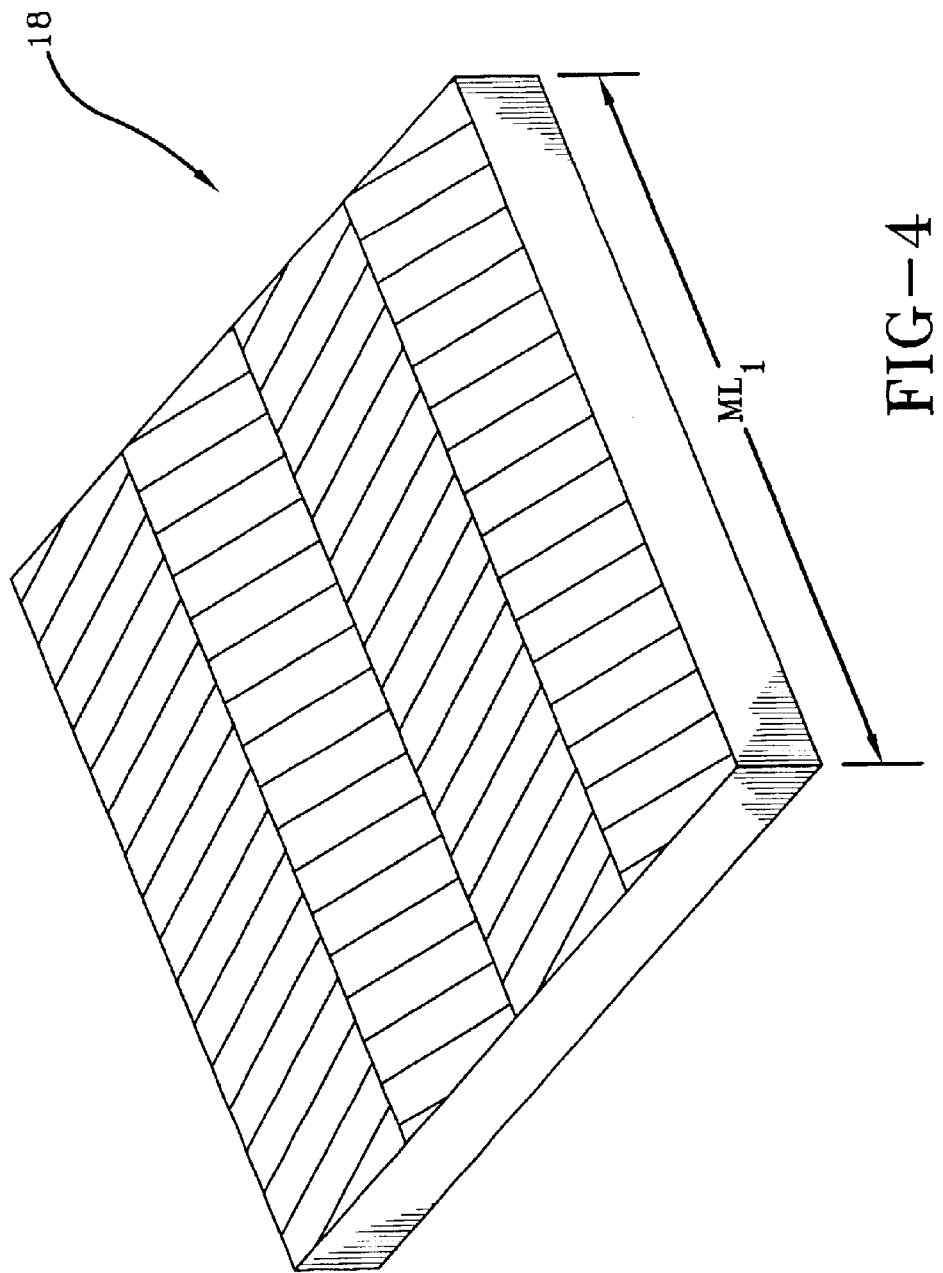
FIG. 4 is a view of the first mold half with a helical tooth pattern.

With reference to FIG. 2, a first mold half 18 is illustrated. With reference to FIG. 1, both the first mold half 18 and the second mold half 20 are illustrated relative to the other portions of the inventive machine 10 and method. The mold has a leading edge 31 and a trailing edge 32 with respect to belt movement between molding steps. When the uncured belt 16 is pressed between the first and second mold halves 18, 20 teeth are formed into the belt 16. The belt 16 generally comprises an elastomer and reinforcing elements, such as wires or filaments twisted into cords, and a fabric layer following the face of the belt teeth. Teeth are formed into the belt 16 in molded sections, wherein each molded belt section has a leading edge and a trailing edge. The leading edge and trailing edge of each molded belt section may only be partially vulcanized since there may be overlap of sequential molded belt sections during curing cycles. With continued reference to FIG. 2, a presently preferred design of teeth is the straight pattern placed perpendicular to the belt circumference shown in the upper surface 22 of the first mold half 18. With reference to FIG. 4, an optional helical tooth pattern is shown in the upper surface 22 of the first mold half 18. With reference to FIG. 3, a cross-sectional schematic representation of teeth 24 and the belt 16 is illustrated. In a currently preferred design, the teeth 24 are covered with a facing fabric 26 and are supported by a tensile load bearing member 28.

With continuing reference to FIG. 1, a first gripper 33 and a second gripper 34 are operatively connected to the manufacturing machine 10. Each of the grippers has tooth shaped cavities in the gripping face, which match the shape of the molded belt teeth. The grippers 33, 34 are operatively connected to a measuring system (not shown). By using a fixed reference point, such as on the mold half 18, 20, the position of the belt teeth can be located to minimize the amount of error in the current molded belt section. Further, locating the molded belt teeth ensures that the partially vulcanized belt teeth in the trailing edge properly engage the tooth cavities of the mold half 18 as it advances through the mold.

With reference again to FIG. 2, it can be seen that the mold halves 18, 20 have a specific and certain number of teeth. It is also true that the mold has a specific length MLI at a certain temperature. However, because the mold is typically made out of metal, as the mold is heated and cooled, the actual length of the mold varies with temperature. In addition, with reference to FIG. 1, the belt 16 has a certain circumference at the radius of the neutral plane of the cord. The neutral plane is defined by the radius at which the belt 16 neither increases nor decreases in length or circumference as it is bent around the cylinders 12, 14. The circumference at the neutral plane is also called the belt pitch length. When a belt 16 is designed for specific application, a design length of the belt is determined. The design length is the ideal length that the belt should be when it is cured. However, due to manufacturing inaccuracies, changes in material specifications and the like, real-world manufacturing situations require that deviations from the design length be tracked, identified, and accommodated for. Therefore, customers generally specify a certain length deviation from the design length that they are still willing to accept and can be used. Belts that fall outside of this range are unsuitable for use. However, even though the length of the belt may change, the number of teeth may not. As such, one of the primary goals of this invention is to produce belts without large errors in the spacing of the belt teeth, particularly in the area of the first and last molded sections. The innovative process will now be described.

The inventive method can be divided into three distinct processes. The first process enables teeth to be molded into the belt, which provides the best belt tooth pitch within a specific molded belt section. The second process enables proper spacing between molded belt sections. The third process corrects error in the remaining uncured portion of the belt after the leading edge of the first molded belt section lies in an axis parallel to the mold. It should be noted that while it is preferred that all three inventive processes be utilized together to minimize tooth pitch error, this is not required.

With reference again to FIG. 1, the first inventive method will be described. The unmolded belt 16 is placed about the cylinders 12, 14 in a continuous loop. The cylinder 14 is moved to increase the center-to-center distance between the cylinders 12, 14, thus, placing the belt 16 in tension. Next, the measuring system is used to measure the center-to-center distance between the cylinders 12, 14. The inside circumference of the belt 16 can be calculated utilizing the center-to-center distance and the known circumference of the cylinders 12, 14. Now having the inside circumference of the belt 16 calculated, the unmolded pitch length circumference of the belt 16 can be estimated. Cylinder 14 is again moved to increase or decrease the center-to-center distance between the cylinders until the estimated pitch length circumference is an integer multiple of the following: the actual length of the mold M1 divided by the actual number of teeth in the mold, which results in the actual pitch of the tooth forming cavities of the mold. The integer multiple is the desired number of teeth in the belt. The estimated required pitch length circumference is the number of teeth in the belt multiplied by the actual pitch of the teeth in the mold. Further, stretching or contracting the belt 16 ensures that the length of the uncured belt section lieing within the range of the mold equals the length of the mold M1 before and/or during molding of the belt. This minimizes the error in the molded belt teeth spacing within one molded belt section. Next, the mold 18, 20 is applied to the belt 16 to create a first molded section of the belt 16. The leading edge 31 of the mold forms the leading edge of the first molded section. The trailing edge 32 of the mold forms the trailing edge of the first molded section.

The second process of the inventive method will now be described. When the mold is opened, the cylinders 18, 20 are rotated to advance the first molded section of the belt 16 in the direction of the leading edge. It should also be noted that the belt 16 advances an approximate integral number of teeth through the mold 18, 20 such that the belt teeth that were formed near the trailing edge of the first molded section are beyond the extent of the leading edge of the mold. As such, the belt teeth that were formed near the trailing edge are now adjacent to the leading edge 31 of the mold. The first gripper 33 is attached to the belt teeth that were formed near the trailing edge teeth of the first molded section of the belt. The measuring system measures the distance of the molded teeth clamped in the first gripper 33 to the leading edge of the mold. Further, the distance from the leading edge of the tooth cavities of the mold to the fixed point is measured. Note that any other fixed point on the mold and/or on the manufacturing machine may be utilized as a reference point to determine the location of the molded teeth as long as such reference point is chosen in accordance with sound engineering judgment.

The cylinders 18, 20 are rotated to position the molded teeth of the belt at an integer multiple of tooth spacing from the teeth in the mold. In other words, the belt 16 is moved forward or backward so that the partially vulcanized belt teeth may readily engage their respective tooth cavities in the mold before the next curing cycle. The mold 18, 20 is applied to the belt 16 in this position to create a second molded section of the belt 16. This first incremental molding process is repeated until the leading edge of the first molded section has advanced around the first cylinder 12 and the second cylinder 14 and is in the straight section near a second gripper 34.

Finally, the third inventive process will be described. Once the leading edge of the first molded section is in the same plane as the mold, two locations should be identified so that the remaining uncured belt portion can be measured. The first location may be the trailing edge of the last molded portion of the belt 16. The second location may be the leading edge of the first cured portion of the belt 16. The first gripper 33 is attached to the teeth at the trailing edge of the most recently molded section. The second gripper 34 is attached to the teeth at the leading edge of the first molded section. The distance between the grippers is measured to define a length of a remaining uncured portion of the belt. The length of the remaining uncured portion of the belt being is compared to the required integer multiple of the tooth spacing in the mold. In other words, the length of the remaining uncured portion of the belt is compared to a design length, wherein the difference between the length of the remaining uncured portion of the belt and the design length is an error. The cylinder 14 is moved to increase or decrease the center-to-center distance between the cylinders 12, 14 until the distance between the grippers 33, 34, which is the remaining unmolded length of the belt 16, is an integer multiple of the tooth spacing of the mold. As such, the error is evenly distributed over the remaining uncured portion of the belt. The cylinders 18, 20 are rotated forward or backward to position the next molded teeth of the belt at an integer multiple of tooth spacing from the teeth in the mold. The mold 18, 20 is applied to the belt in this position to create the next molded section of the belt. This second incremental molding process is repeated until the leading edge of the first molded section has advanced to the trailing edge 32 of the mold and the last molded section is complete.

The advantages of this method are that the cumulative tooth spacing errors occurring in the first incremental molding process are detected and small. Acceptable compensating errors are spread over all of the molded sections in the second incremental molding process so that a large unacceptable tooth pitch error is avoided in the last molded section. Formerly, all of the variation between design length and actual length of the belt 16 had to be accommodated for in the last molded section. Under the innovative method described herein, small changes in length from the design length are accommodated in each molded section, thereby spreading the variations in acceptable increments over the entire length of the belt 16.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A method for manufacturing a cured, toothed belt on a machine, the machine having a first cylinder, a second cylinder, first and second grippers, and a mold for forming teeth into an unmolded belt comprising an elastomer and reinforcing elements, the molding having a leading edge and a plurality of tooth cavities defined therein, the tooth cavities and mold length defining a tooth pitch, the method comprising the steps of:

positioning the unmolded belt on the machine;

molding a plurality of teeth into a first belt section, the belt section having a leading edge and a trailing edge;

advancing a portion of the first belt section out of the mold;

repeatedly molding belt sections until the leading edge of the first belt section travels around the first and second cylinders such that the leading edge lies in an axis parallel to the mold;

attaching the first gripper to a first location on the belt;

attaching the second gripper to a second location on the belt;

measuring the distance between the grippers;

determining the error in the remaining unmolded portion of the belt;

increasing or decreasing the center-to-center distance between the first and second cylinders; and, distributing the error about the remaining unmolded portion of the belt.

2. The method of claim 1, wherein the mold has a tooth pitch, and wherein positioning the unmolded belt on the machine further comprises the steps of:

estimating a pitch length circumference; and, stretching the unmolded belt by moving the second cylinder so that the estimated pitch length circumference is an integer multiple of the mold tooth pitch.

3. The method of claim 1, wherein after advancing the portion of the first belt section out of the mold, the method further comprises the steps of:

attaching the first gripper to belt teeth formed near the trailing edge teeth of the first belt section;

measuring the distance from the first gripper to a fixed point on the machine;

measuring the distance from the leading edge of the mold to the fixed point; and, determining if the belt is positioned within the mold such that a second molded belt section is properly positioned relative to the first molded belt section.

4. The method of claim 3, further comprising the step of rotating the cylinders forward or backward so that a partially vulcanized belt tooth may readily engage its respective tooth cavity.

5. The method of claim 1, wherein the first cylinder is fixed.

6. The method of claim 1, wherein the distance between the first and second grippers defines a length of a remaining unmolded portion of the belt.

7. The method of claim 6, wherein determining the error in the remaining unmolded portion of the belt further comprises the step of:
   comparing the length of the remaining unmolded portion of the belt to a design length.

8. The method of claim 1, wherein distributing the error about the remaining unmolded portion of the belt further comprises the step of:
   increasing or decreasing the center-to-center distance of the cylinders until the measured distance between the first and second grippers is an integer multiple of the tooth pitch of the mold.

9. The method of claim 1, wherein the first location is where teeth are molded at a trailing edge of a most recently molded section of the belt.

10. The method of claim 1, wherein the second location is where teeth are molded at the leading edge of the first molded belt section.

* * * * *